Jan. 16, 1934.  B. E. HOUSE  1,943,827

SHAFT MOUNTING

Filed Jan. 25, 1929

INVENTOR.
BRYAN E. HOUSE
BY
*M. W. McConkey*
ATTORNEY

Patented Jan. 16, 1934

1,943,827

UNITED STATES PATENT OFFICE 1,943,827

SHAFT MOUNTING

Bryan E. House, South Bend, Ind., assignor to Bendix Brake Company, South Bend, Ind., a corporation of Illinois Application January 25, 1929. Serial No. 335,117

5 Claims. (Cl. 308—203)

This invention relates to supports for shafts and is illustrated as embodied in novel support for a transverse shaft forming part of the operating connections for a set of four-wheel automobile brakes. An object of the invention is to provide a mounting for the shaft which is free as possible from friction and yet which includes means automatically taking up for wear or for inaccuracies to manufacture and which prevents rattling of the parts.

In one desirable arrangement the shaft is supported by a bracket or the like having an opening slightly larger than the shaft for encircling the shaft. The bracket is provided with means such as anti-friction rollers which engage the shaft and against which the shaft is held by novel means preferably including a spring which is tensioned between the shaft and the bracket so that it automatically holds the shaft against the rollers regardless of wear and regardless of slight inaccuracies in the manufacture of the various parts. Preferably the rollers and the spring are arranged approximately 120 degrees apart and I prefer that the spring be in a leaf spring formed to engage the bracket at its center and having its ends arranged on opposite sides of the bracket and bearing under tension against the shaft.

Figure 1:
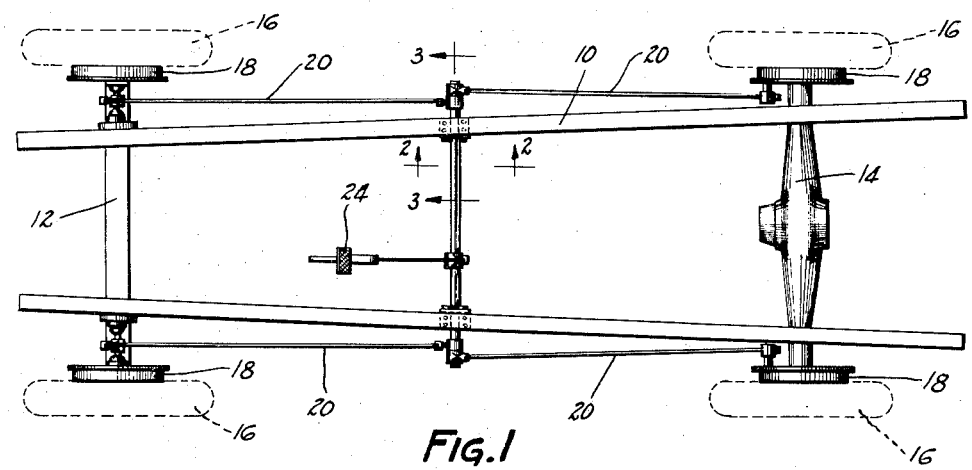
Figure 2:
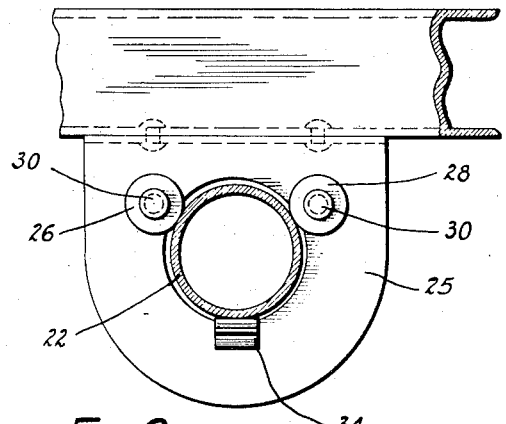
Figure 3:
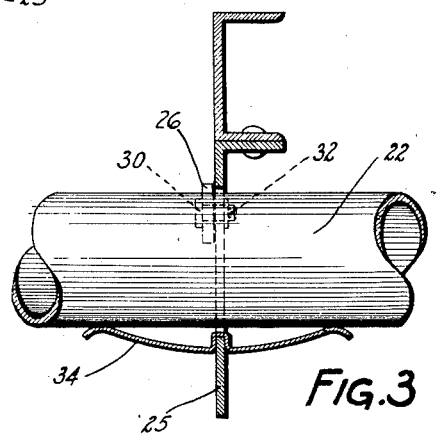

The above and other objects and features of the invention, including various novel and desirable details of construction will be apparent from the following description of the illustrative embodiments shown in the accompanying drawing, in which:

Figure 1 is a top plan view of part of an automobile chassis showing the relation of the shaft to the other parts;

Figure 2 is a section on the line 2—2 of Figure 1 showing the novel shaft supporting bracket in side elevation; and Figure 3 is a partial section on the line 3—3 of Figure 1 showing the arrangement of the spring. The automobile chassis illustrated in Figure 1 includes the usual frame 10 supported by means of the ordinary vehicle springs (not shown) on the front axle 12 and a rear axle 14 carried by road wheels 16 having brakes 18. The brakes are operated by brake rods or other connections 20, all of which are shown connected to levers at the ends of a transverse shaft 22 operated by means such as a pedal 24.

The shaft 22, preferably of relatively large diameter and formed as a hollow tube to increase its strength while at the same time diminishing its weight is supported on the frame 10 by novel means forming the subject matter of the present invention.

Adjacent each end of the shaft there is riveted or otherwise secured to the frame 10 a novel stamped bracket 25 having an opening slightly larger than the shaft to receive the shaft. The bracket 25 is provided with anti-friction means engaging the shaft preferably including rollers 26 and 28 spaced approximately 120 degrees apart and engaging the shaft. The rollers are shown as inexpensive steel stampings mounted on the bracket by headed pivots 30 held against displacement by means such as cotter pins 32.

The bottom of the shaft is yieldingly engaged by the tensioned ends of a leaf spring 14 extending lengthwise of the shaft and having its center return bent to form a clip embracing the bracket 25 as shown in Figure 3 so that the two ends of the spring extend in opposite directions from the bracket 25. The spring 34 automatically holds the shaft against the rollers 26 and 28 regardless of the wear of the parts or of slight inaccuracies in manufacture. The thrust from the pedal 24 is in such a direction that it is taken by the rollers 26 and 28 rather than by the spring 34.

While one illustrative embodiment has been described in detail, it is not my intention to limit the scope of the invention to that particular embodiment or otherwise than by the terms of the appended claims.

I claim:

1. Operating mechanism comprising, in combination, a shaft, a bracket having an opening encircling the shaft, anti-friction means carried by the bracket and engaging the shaft and permitting it to turn freely about its axis, and means including a leaf spring supported by the bracket for yieldingly urging the shaft against the anti-friction means.

2. Operating mechanism comprising, in combination, a shaft, a bracket having an opening slightly larger than the shaft and encircling the shaft, anti-friction means carried by the bracket and engaging one side of the shaft, and means at the other side of the shaft yieldingly urging the shaft against the anti-friction means and including a leaf spring secured to the bracket and bearing under tension against the shaft.

3. Operating mechanism comprising, in combination, a shaft, a bracket having an opening slightly larger than the shaft and encircling the shaft, anti-friction means carried by the bracket and engaging one side of the shaft, and means at the other side of the shaft yieldingly urging the shaft against the anti-friction means and including a leaf spring formed at its center with a clip embracing the bracket and having its ends arranged on opposite sides of the bracket and tensioned against the shaft.

4. A shaft hanger comprising a bracket having an opening, a pair of spaced rollers on the bracket having their peripheries extending over the perimeter defining the opening and a compression member on the bracket adaptable for co-operation with the rollers, the rollers and said member forming a three-point support for a shaft in the opening.

5. A shaft hanger comprising a bracket having an opening, rollers positioned for rotation on the bracket having their peripheries extending over the perimeter defining the opening and a leaf spring extending through the opening adaptable for co-operation with the rollers.

BRYAN E. HOUSE.